United States Patent [19]
Munro

[11] Patent Number: 5,882,035
[45] Date of Patent: Mar. 16, 1999

| [54] | CHILD SEAT AIR BAG SAFETY SYSTEM |
|---|---|
| [75] | Inventor: Donald F. Munro, Mountain View, Calif. |
| [73] | Assignee: Munro Associates, Mountain View, Calif. |
| [21] | Appl. No.: 907,273 |
| [22] | Filed: Aug. 6, 1997 |
| [51] | Int. Cl.⁶ .............................. B60R 21/32; B60N 2/28 |
| [52] | U.S. Cl. ........................ 280/735; 280/732; 297/250.1 |
| [58] | Field of Search ..................... 280/735, 732, 280/728.1, 730.1; 297/250.1, 256.1, 256.11, 256.13, 216.11 |

[56] References Cited

U.S. PATENT DOCUMENTS

| 3,992,028 | 11/1976 | Abe et al. .............................. 280/728.1 |
| 5,324,074 | 6/1994 | Christian et al. ....................... 280/732 |
| 5,454,591 | 10/1995 | Mazur et al. ........................... 280/735 |
| 5,468,014 | 11/1995 | Gimbel et al. .......................... 280/735 |
| 5,474,327 | 12/1995 | Schousek ................................ 280/735 |
| 5,482,314 | 1/1996 | Corrado et al. ........................ 280/735 |
| 5,515,933 | 5/1996 | Meyer et al. ............................ 180/273 |
| 5,528,698 | 6/1996 | Kamei et al. ........................... 382/100 |
| 5,544,914 | 8/1996 | Borninski et al. ...................... 280/735 |
| 5,570,903 | 11/1996 | Meister et al. .......................... 280/735 |
| 5,690,356 | 11/1997 | Lane, Jr. ................................. 280/735 |

FOREIGN PATENT DOCUMENTS 44 26 677   2/1995   Germany ................................ 280/735

*Primary Examiner*—Peter C. English
*Attorney, Agent, or Firm*—Skjerven, Morrill, MacPherson, Franklin & Friel; Alan H. MacPherson

[57] ABSTRACT

A sensor is provided at the end of a mounting assembly to receive a mounting piece attached to a child's seat thereby to disable the air bag targeted for the location of the child's seat in an automobile.

4 Claims, 12 Drawing Sheets

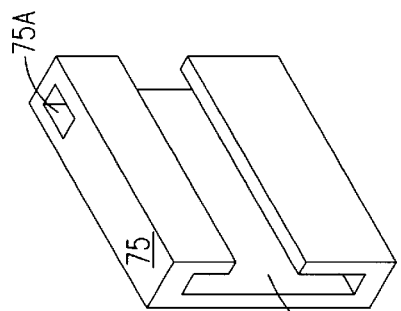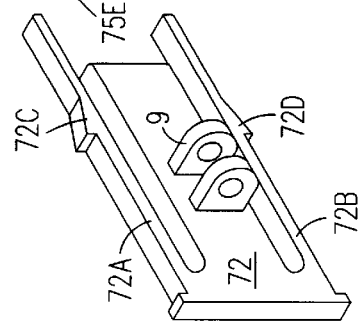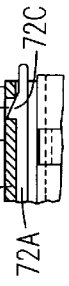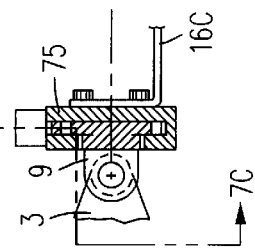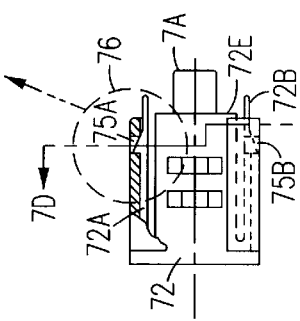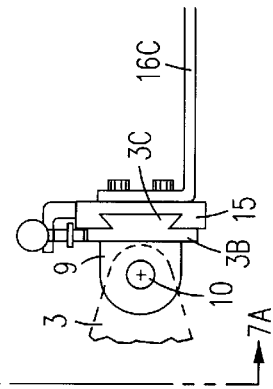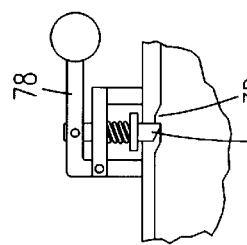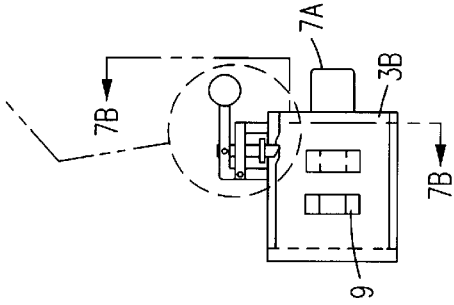

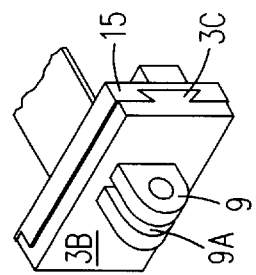
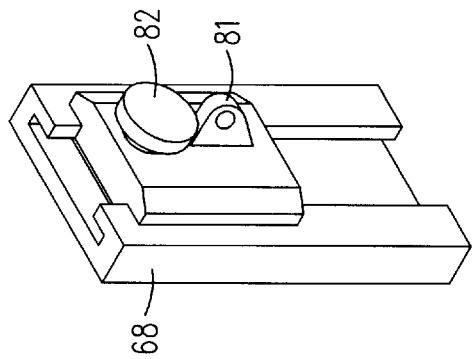
FIG. 8B
FIG. 8C
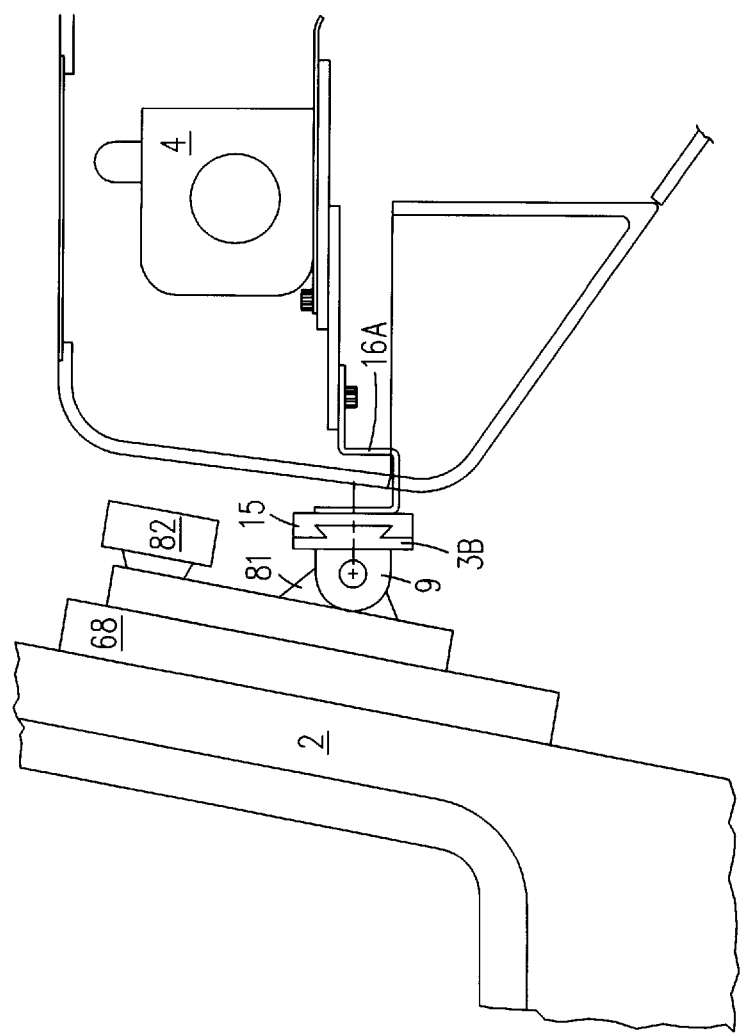
FIG. 8A

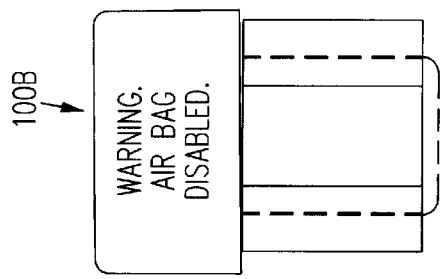
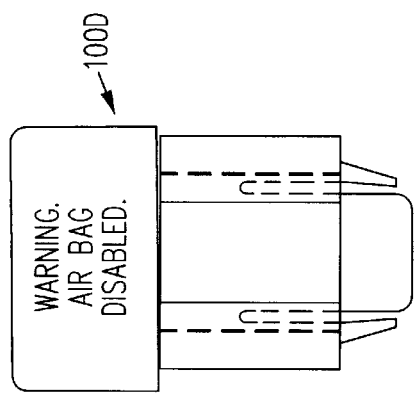
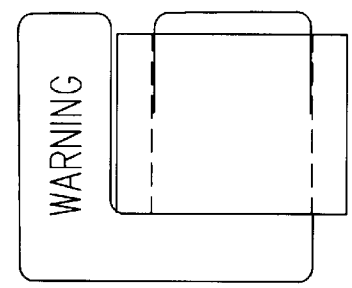
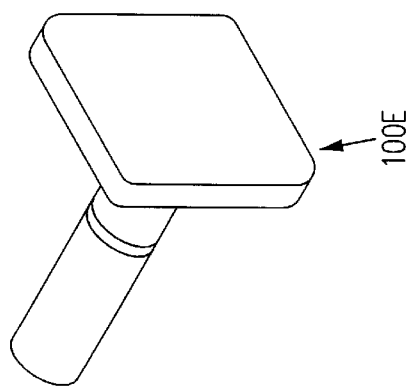

CHILD SEAT AIR BAG SAFETY SYSTEM

FIELD OF THE INVENTION

The present invention relates generally to vehicle air bag safety systems designed to protect drivers and passengers in the event of a vehicular accident or collision. More specifically, it relates to a safety system to prevent the deployment of an air bag when a child seat is installed in the vehicle seat corresponding to the air bag.

BACKGROUND OF THE INVENTION

The use of air bag safety systems is now widespread throughout the automotive industry. Generally, the conventional air bag systems have been effective in limiting damage to vehicular occupants and drivers in most instances of their deployment. Tragically, there have been a few cases where injuries and deaths of children have been caused by the deployment of air bags. There has been a long felt need to eliminate the possibility of these occurrences.

Some conventional air bag systems include occupant sensing circuits. These circuits can be used to inhibit the deployment of a corresponding air bag, or air bags, when a driver or passenger seat is unoccupied. This capability is useful because conventional air bag systems provide for each air bag within a vehicle to be targeted to protect the occupant of a particular and predesignated seat.

SUMMARY OF THE INVENTION

An object of the present invention is to provide a safety system which inhibits the deployment of an air bag when a child seat is installed into a vehicle seat to which the air bag is targeted. In one embodiment of this invention, an anchor receiving module including a sensor is mounted in the vehicle. The sensor is electrically connected to the air bag safety system of the vehicle. When the sensor senses the installation of a child seat into the area of a particular vehicular seat, it will prevent the deployment of any corresponding air bag or air bags that have been predesignated to deploy in order to protect the occupant of that seat.

The anchor is mounted or secured to a structural member of the vehicle, to the vehicle dashboard, and/or to the front or back of a passenger seat of the vehicle in various preferred embodiments.

The anchor receiving module accepts the installation of a child seat and physically secures the child seat to the vehicle. A child seat in accordance with the present invention includes a mounting piece that secures the child seat to the anchor.

Detachable disabling slides and disabling plaques are used in certain preferred embodiments of the present invention to disable the deployment of a selected air bag or air bags by their installation alone, and without the need to fully install the child seat.

Provision is made to ensure that the child seat will not swing upwards in the event of a collision or accident by securing the lower part of the child seat by means of a strapping system that adjusts to the seat geometry.

Certain preferred embodiments of the present invention are integrated into vehicle air bag systems which include conventional occupant sensing circuits. Alternate preferred embodiments of the present invention further comprise indicators that inform a user if an air bag is disabled or is enabled for deployment.

BRIEF DESCRIPTION OF THE DRAWINGS

FIGS. 7A through 7G show an anchor for a child's seat in accordance with this invention;

FIGS. 8A, 8B and 8C show a side view and two isometric views, respectively, of an adjustable child's seat bracket with a horizontal slide;

FIGS. 10A, 10B, 10C, 10D and 10E show plaques to be installed into an anchor in place of a child's seat to disable the air bag;

DETAILED DESCRIPTION OF THE DRAWINGS

Figure 1:
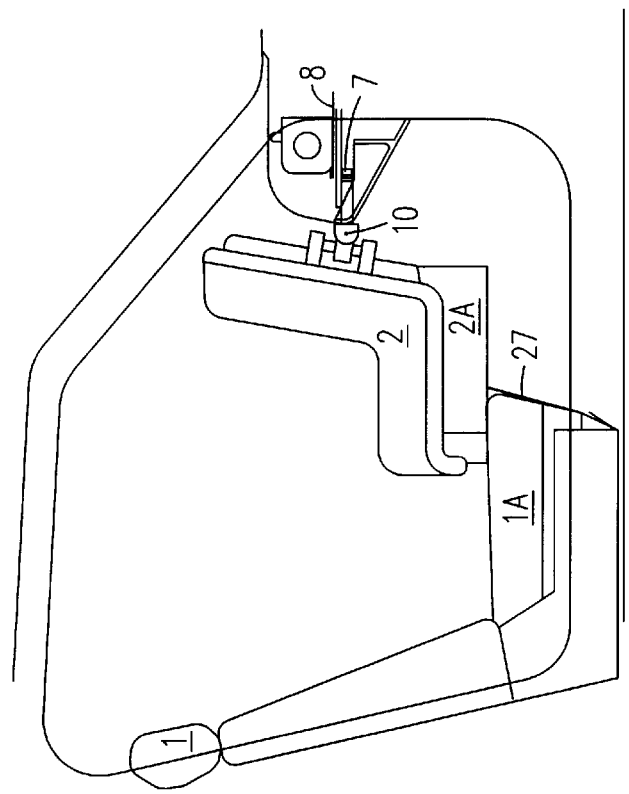
FIG. 1 is a side view of a child's seat installed in the vehicle.

In FIG. 1, the car seat 1 is shown in the fully forward position. The child's seat 2 includes on its back a mounting piece or seat bracket 3, versions of which are shown in more detail in subsequent Figures, installed into the anchor 11 (FIGS. 3A and 3B) which is mounted to a structural member 8 of the car. The mounting piece 3 includes swivel bracket 9 to allow the child's seat 2 to be adjustably secured to the anchor 11. Since the swivel bracket 9 allows the seat 2 to rotate clockwise or counterclockwise about pivot or swivel point 10, the child's seat 2 must be prevented from swinging upwards about swivel point 10. This is done by means of a strap 27 which is attached either to the bottom of the passenger seat 1 or to a receptacle mounted on the floor of the car. The other end of strap 27 is attached to a self adjusting slide (not shown in FIG. 1 but shown in FIGS. 9A, 9B and 9C) mounted under the child's seat 2 to give a secure hold down.

Figure 2:
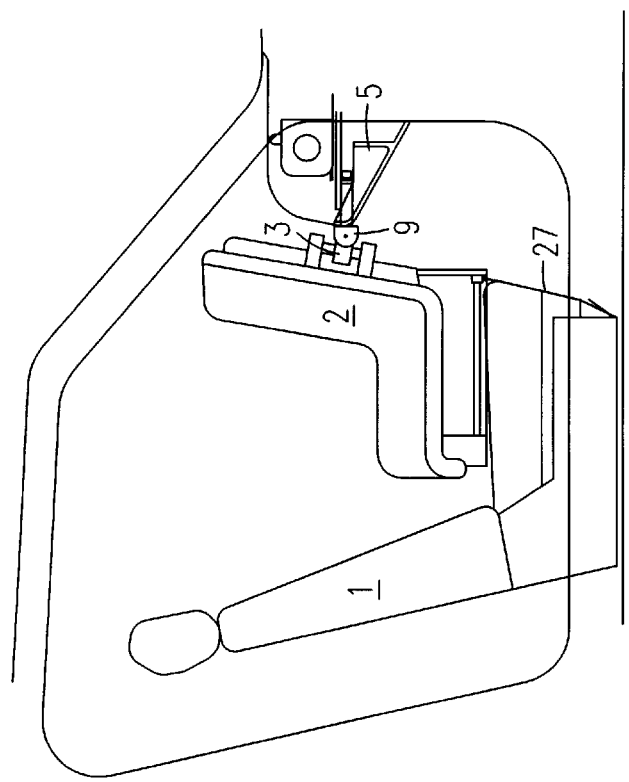
FIG. 2 shows the child's seat of FIG. 1 with the passenger seat in the fully back position.

FIG. 2 shows the passenger seat 1 in the fully back position. The front end of child's seat 2 rests, as shown in FIG. 2, on the top of horizontal portion 1A of seat 1. The back end 2A of child's seat 2 does not rest on the top of horizontal portion 1A of seat 1. Strap 27 prevents child's seat 2 from rotating upward and clockwise about pivot point 10.

Figure 3A:
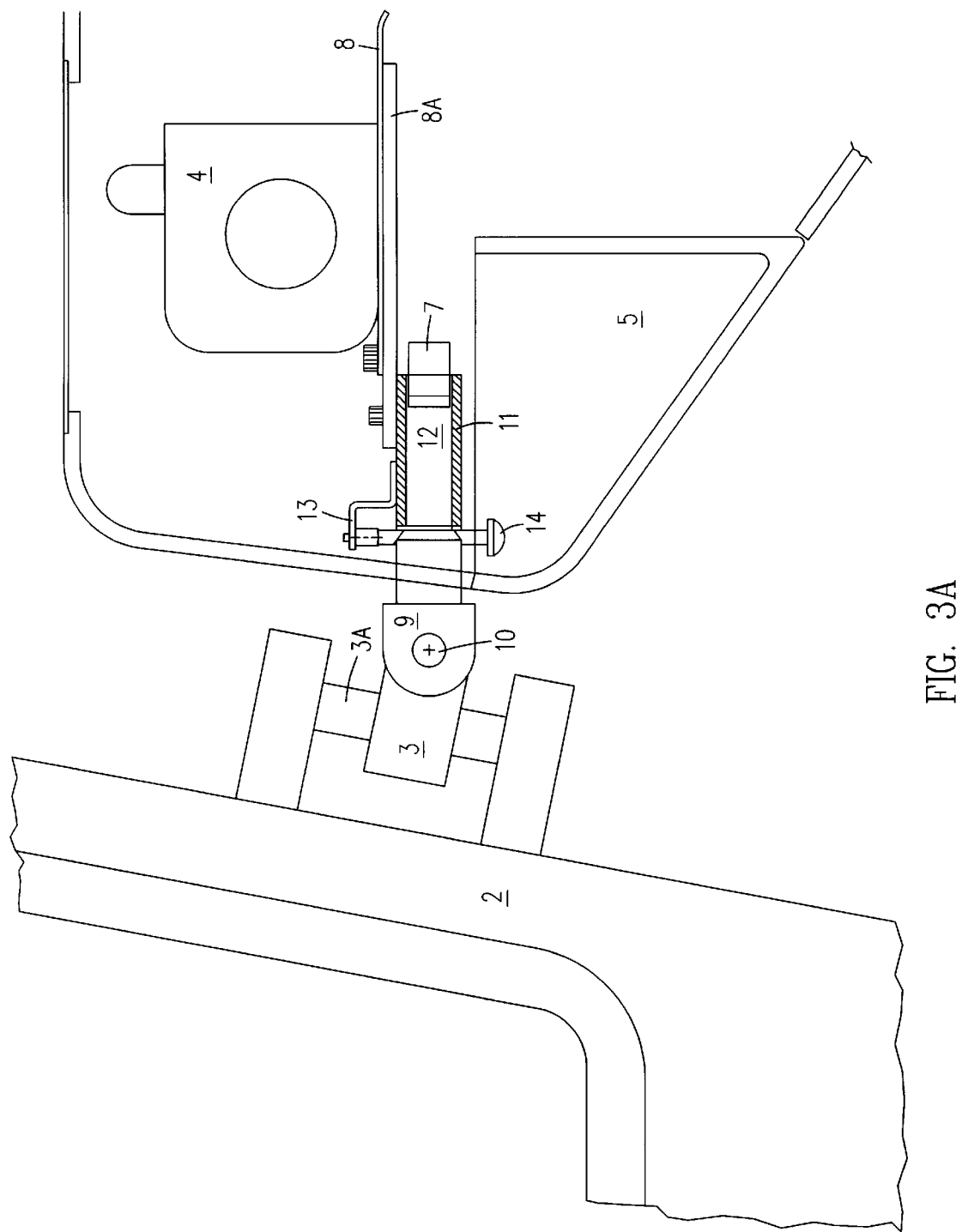
FIGS. 3A, 3B, 3C and 3D show in more detail an anchor and mounting piece for the child's seat in accordance with this invention.
Figure 3C:
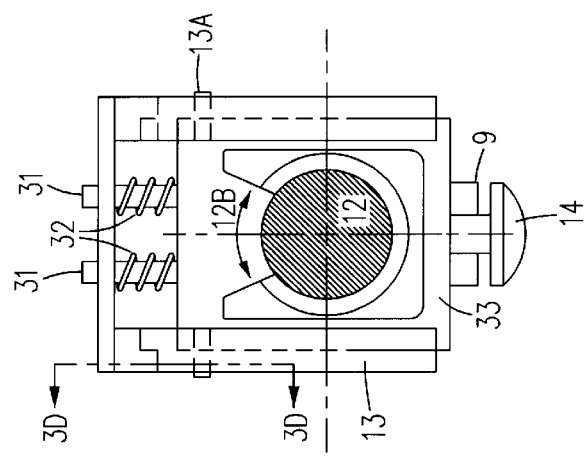
Figure 3D:
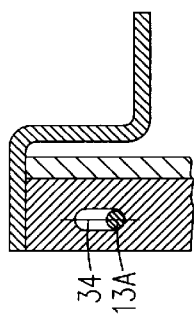
Figure 3B:
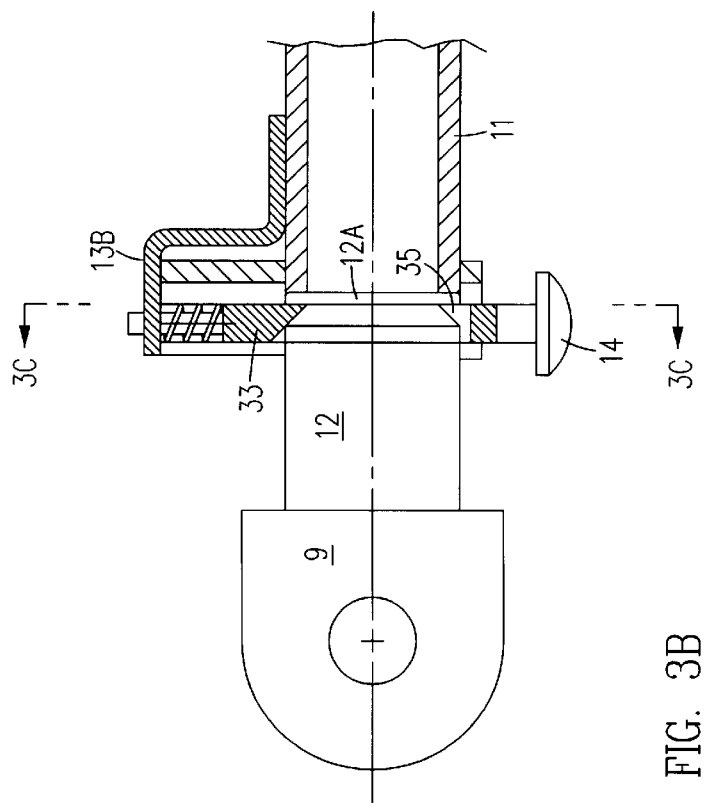

FIG. 3A shows the anchor 11, swivel bracket 9 and mounting piece 3 in more detail. The anchor 11 is secured to a structural member 8 by means of a plate 8A. The mounting piece 12, which is an extension of swivel bracket 9, is inserted into the anchor 11 and is locked in position by a spring loaded device 13 (shown in more detail in FIG. 3C) which prevents accidental withdrawal of the mounting piece 12 from the anchor 11. Mounting piece 12 can be released from anchor 11 by depressing the release mechanism 14. The mechanism for locking the mounting piece 12 into the anchor 11 is shown in more detail in FIGS. 3B and 3C. FIG. 3C is a cross sectional diagram along section 3C—3C of FIG. 3B. FIG. 3D is a cross sectional diagram along section 3D—3D of FIG. 3C. When the mounting piece 12 is pushed into the anchor 11, the flange 12A on the mounting piece 12 pushes the pawl plate 33 up against the springs 32. When the flange 12A passes the pawl plate 33, pawl plate 33 is pushed down by the springs 32 into the annular recess 35 behind the flange 12A retaining the mounting piece 12 in position in the anchor 11. The pawl plate 33 is adjusted so that the mounting piece 12 can rotate clockwise or counter clockwise (as shown by two-headed arrow 12B in FIG. 3C) in the anchor 11 thus allowing the child seat 2 to sit squarely on the passenger seat 1. The springs 32 are retained by spring posts 31 and exert pressure between the pawl plate 33 and the top 13B of the body of the locking device. Movement of the pawl plate 33 in the locking device 13 is restricted by pins 13A in the pawl plate which slide in slots 34 in the body of the locking device 13. When the mounting piece 12 is installed and locked in anchor 11, mounting piece 12 activates a sensor 7. Sensor 7 typically will be a switch but could be an optical coupler or any other sensing mechanism. Alternatively sensor 7 can be the formation of a conductive path through mounting piece 12 between two physically separated electrical contacts. In this configuration, the seat bracket 3, which is capable of sliding up and down rod 3A to allow vertical adjustment of child seat 2, is permanently affixed to swivel bracket 9 which in turn is rigidly attached to or part of the mounting piece 12. Swivel bracket 9 incorporates a swivel, so as to allow child's seat 2 to rotate about swivel point 10 and mounting piece 12, attached to swivel bracket 9. Mounting piece 12 plugs into the anchor 11 mounted on structural member 8 of the car. Note that the mounting piece 12 inserted into anchor 11 can be round thereby allowing rotation in two directions of the child's seat attached to mounting bracket 3 as shown for example in FIG. 3C.

The air bag inflator 4 and the glove compartment 5 are shown in typically relative positions to the anchor 11. The air bag inflator 4 is shown in it's approximate position. A typical glove compartment 5 is also shown.

Figure 5:
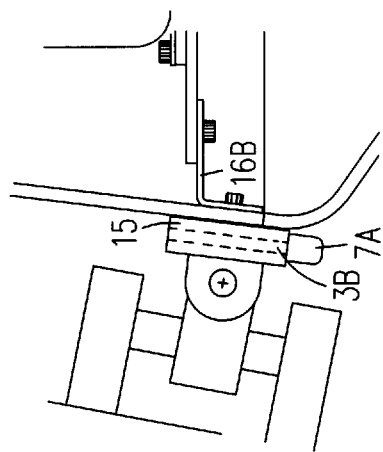
FIGS. 4 and 5 show alternate ways of mounting the child's seat in accordance with this invention.
Figure 4:
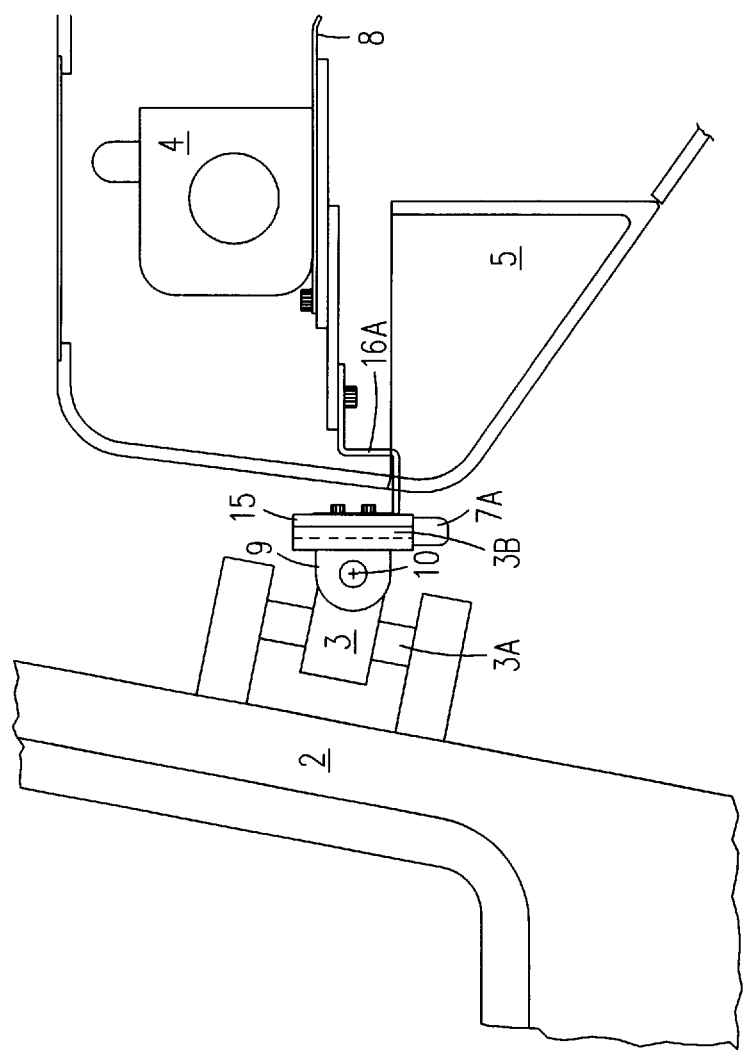
Figure 6A:
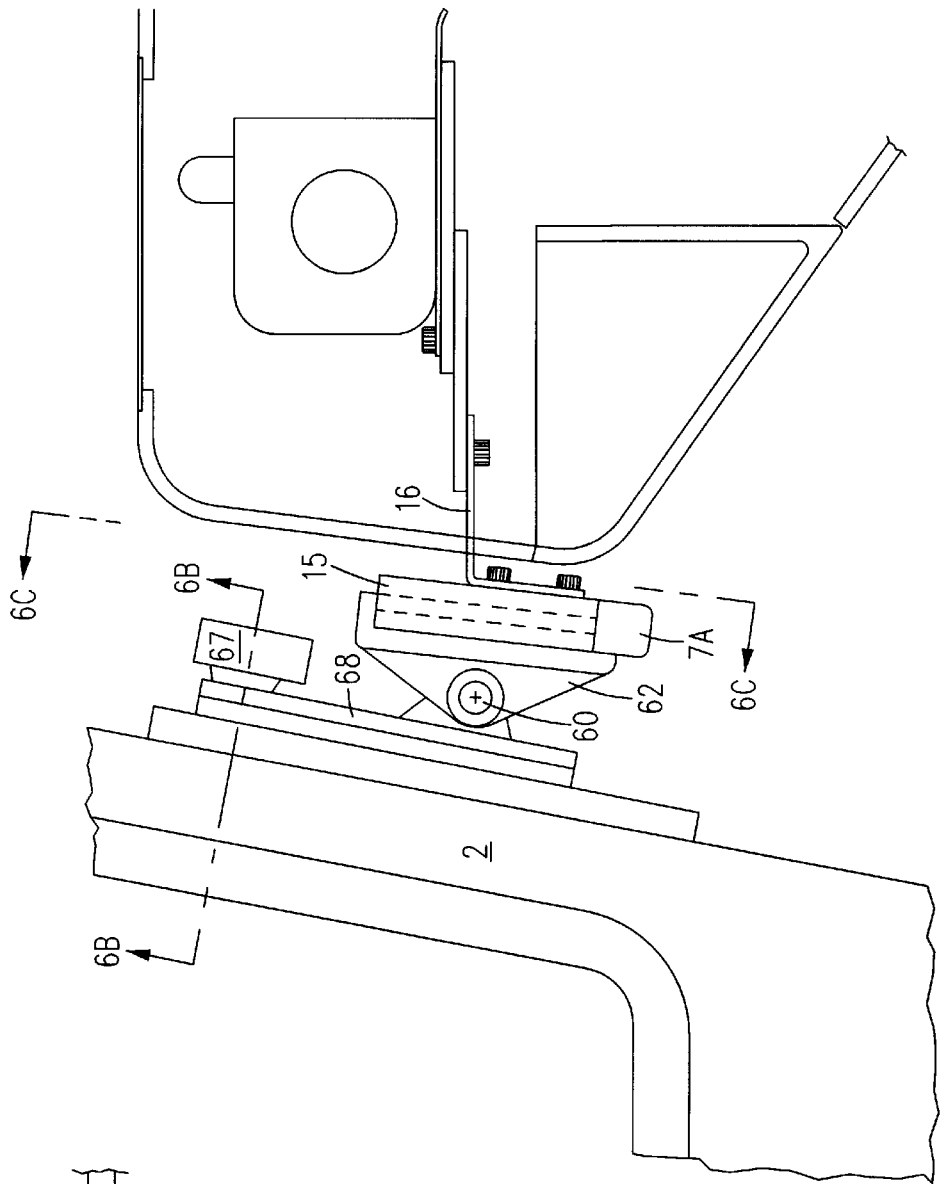
FIGS. 6A, 6B and 6C show an adjustable child's seat bracket for use with this invention.
Figure 6B:
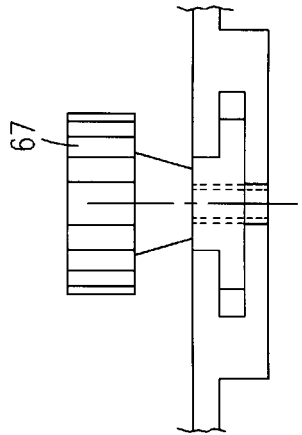
Figure 6C:
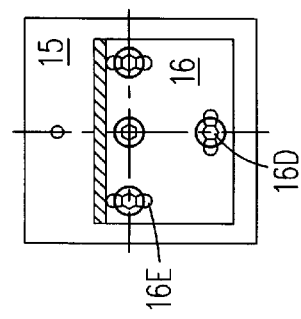

FIGS. 4 and 5 show alternate ways of attaching a mounting piece to a vehicle. The structures shown in FIGS. 4 and 5 are used when the system is being added to a car that was not built to incorporate the "plug in" anchor system or when the configuration shown in FIG. 1 is not suitable due to space restrictions. The anchors shown in FIGS. 4 and 5 include brackets 16A and 16B, respectively, attached to appropriate structural members of the car. Each of brackets 16A and 16B holds a slider type anchor 15 which accepts a matching mounting piece 3B attached to swivel bracket 9. The anchor incorporates a sensor 7A to indicate that mounting piece 3B is securely installed. Again, in FIGS. 4 and 5, the seat bracket 3 is permanently attached to the swivel bracket 9. The mounting brackets 16A and 16B are not needed if the dash is sufficiently strong, structurally, in which case the slider type anchor 15 can be attached directly to the dash. The mounting piece 3B, when installed, is locked in position. FIG. 6C shows how the anchor 15 can be attached to the mounting bracket 16 to accommodate either vertical or horizontal configurations as shown in FIGS. 7A, 7C and 6A. FIG. 6C is a cross sectional diagram along section 6C—6C of FIG. 6A. FIG. 6B is a cross sectional diagram along section 6B—6B of FIG. 6A. FIG. 7A is a cross sectional diagram along section 7A—7A of FIG. 7B. FIG. 7B is a cross sectional diagram along section 7B—7B of FIG. 7A. FIG. 7C is a cross sectional diagram along section 7C—7C of FIG. 7D. FIG. 7D is a cross section diagram along section section 7D—7D of FIG. 7C. Screws 16D secure mounting bracket 16 to anchor 15 through slots 16E. These slots 16E (three slots are shown in FIG. 6C but only one slot is numbered 16E for simplicity) allow the anchor 15 to be rotated relative to bracket 16 to ensure that the child seat 2 sits squarely on the passenger seat 1. FIGS. 7A, 7B and 7G show one embodiment of the seat bracket 3 used for mounting the child's seat 2 in an automobile. Mounting piece 3B for holding the child's seat is shown in side view in FIG. 7B and in front view in FIG. 7A. In FIG. 7B, swivel bracket 9 is attached to mounting piece 3B so as to allow the mounting piece 3 to rotate clockwise or counterclockwise about swivel point 10. Mounting piece 3 is shown with breaklines to indicate that an extension of the mounting piece 3 would encompass the structure such as shown, for example, in FIG. 4 to the left of swivel bracket 9. Attached to the structure associated with mounting piece 3 would be child's seat 2. As shown in FIG. 7B, matching mounting piece 3B, which contains a protuberance 3C which has inwardly flared sides, such that protuberance 3C will lock into a corresponding slot in slider type anchor 15, is slipped into slider type anchor 15 by the user. Locking mechanism, consisting, for example, of a lever 78 and a spring loaded dog or pawl 77, locks tooth 3D of mounting piece 3B in slider type anchor 15. This mechanism is of a well-known design and thus will not be described in further detail, but it is shown in larger detail in FIG. 7G.

FIG. 7A shows a front view of the structure shown in side view in FIG. 7B. In FIG. 7B, seat bracket 3 is shown extending to the left from the center of swivel bracket 9. Swivel bracket 9 in turn is mounted on one face of mounting piece 3B. Mounting piece 3B is shown as mounted on anchor 15 by having protuberance 3C slid into the mating slot contained in anchor 15 as shown in the side view of FIG. 7B. Anchor 15 is secured to bracket 16C as shown. As shown in FIG. 7A, a sensor 7A is provided to detect the insertion of mounting piece 3B into anchor 15.

FIGS. 7C, 7D, 7E and 7F illustrate another mounting structure for use in this invention. As shown in FIG. 7D, swivel bracket 9 extends from the mounting piece 3 to which will be attached the child's seat, as explained above. Swivel bracket 9 is mounted on mounting piece 72. Sliding, compressible tines or tongs 72A, 72B which are fixedly attached to mounting piece 72 can then be slid into anchor 75. Tines 72A and 72B have protuberances 72C and 72D, respectively, extending from their outer surfaces in the vertical plane so as to lock into corresponding recesses 75A, 75B contained in anchor 75. These recesses are shown as recesses 75A and 75B in anchor 75. Anchor 75 is formed of metal or similarly hard and durable material and contains a slot 75E into which mounting piece 72 is inserted. Tongs 72A and 72B must be squeezed together when mounting piece 72 is being inserted into slot 75E. Because of the taper on the protuberances 72C and 72D, the mere insertion of mounting piece 72 into slot 75E will cause tongs 72A and 72B to be bent toward each other. Upon full insertion of mounting piece 72 into slot 75E, tongs 72A and 72B spring back to their normal positions when wedge-shaped protuberances 72C and 72D reach corresponding recesses 75A and 75B, respectively, in anchor 75. To remove mounting piece 72 from anchor 75, tongs 72A and 72B are squeezed together while simultaneously mounting piece 72 is withdrawn to the left from slot 75E.

Circle 76 in FIG. 7C shows a portion of the structure which is shown in expanded view in FIG. 7E. FIG. 7E shows the protuberance 72C on tong 72A located within recess 75A of anchor 75 thereby to lock mounting piece 72 in anchor 75. A sensor 7B is shown in an optional position on top of recess 75A to sense the presence of protuberance 72C in recess 75A. Such a sensor can in one embodiment be a microswitch. FIG. 7C shows sensor 7A mounted so as to be activated by the end of center portion 72E of mounting piece 72.

FIGS. 6A, 6B and 6C show a child's seat bracket 68 that has its position relative to the child's seat 2 adjustable and is able to be locked in position with a screw lock 67. The mounting piece 62 is attached to the child's seat 2 through the pivot 60 and slides vertically down into the anchor 15 of the type shown in FIG. 4. The mounting piece 62 is locked into the anchor 15 in the same way as described above in conjunction with FIGS. 7A through 7G for example. Other locking devices can also be used as appropriate, for example. Although FIGS. 7A, 7B, 7C, 7D, 7E and 7F are related to a horizontal anchor configuration and FIGS. 6A and 6B relate to a vertical anchor configuration, the locking devices are the same.

FIGS. 7A through 7G show the anchor mounted horizontally. This prevents the child seat from moving upwards in a collision and may be easier to install in small cars. The locking devices shown are, firstly a spring loaded pawl 77 (FIG. 7G) which is fixed to the anchor 15 (FIG. 7B) and engages a tooth 3D (FIG. 7G) on the mounting piece 3B. Pawl 77 can be released by means of the lever 78. The sensor 7A (FIG. 7A) (which might be a microswitch, for example) is activated when the mounting piece 3B (FIGS. 7A and 7B) is in position and locked.

FIGS. 8A, 8B and 8C show the structure of FIG. 6A rotated 90° to allow the mounting piece 3B to be slid horizontally into anchor 15. FIG. 8C shows an isometric view of mounting piece 3B inserted into anchor 15 with protuberance 3C slid into the locking groove contained within anchor 15. Swivel bracket 9 extends from mounting piece 3C and has an opening 9A to accept the mating member 81 from sliding bracket 68 mounted on the back of child's seat 2. Knob 82 allows the user to tighten the sliding bracket to hold the car seat at a selected height in relation to anchor 15. Anchor 15 is attached to the car by mounting bracket 16A (see FIG. 4, for example).

Figure 9B:
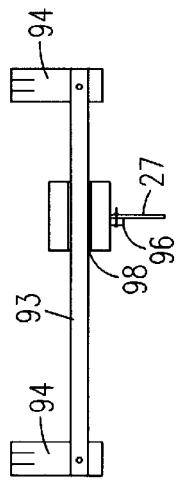
FIGS. 9A, 9B, 9C and 9D show an isometric view and three side views, respectively, of an adjustable child's seat anchor of this invention.
Figure 9D:
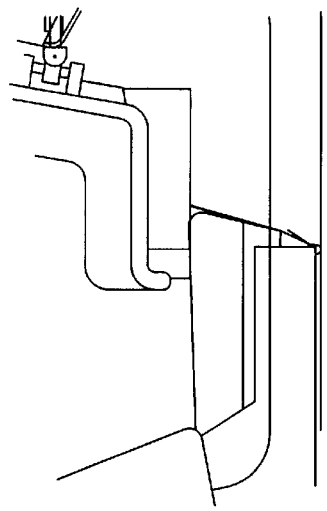
Figure 9A:
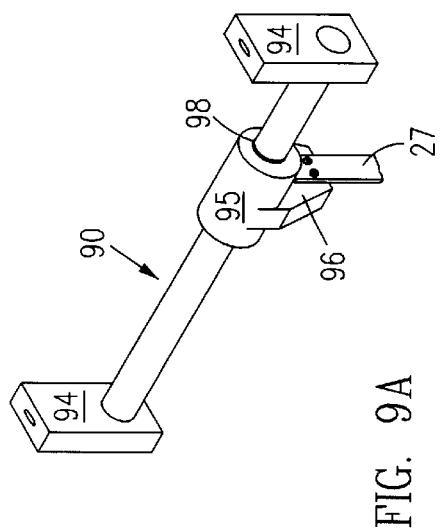
Figure 9C:
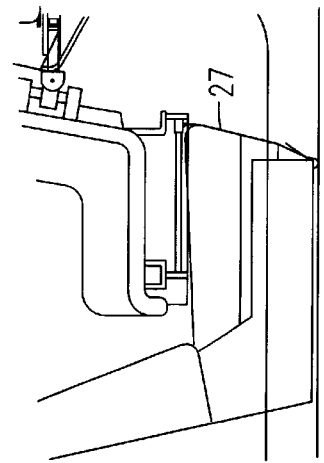

FIGS. 9A and 9B show the adjustable child seat anchor 90. The securing strap 27 is attached to the slider 95 though an anchor 96. Slider 95 moves on a bearing 98 along the rod 93. Rod 93 is attached to the under side of the child's seat 2 by pillars 94. When strap 27 is tightened, slider 95 will move along the rod 93 to the position that will give the shortest length of strap 27 between slider 95 and the hold down in the car or on the passenger seat. This will ensure a safe tie down of the child seat 2 in the forward position of the passenger seat 1 as shown in FIG. 9C or in the fully back position as shown in FIG. 9D.

FIGS. 10A, 10B, 10C, 10D and 10E show respective plaques 100A, 100B, 110C, 100D, and 100E that can be inserted into anchors instead of mounting pieces if one wants to disable the air bag without a child seat being present. This can be done to reduce the cost of repair in the event of an accident that would inflate the passenger side air bag when there is no passenger to protect. There may be other circumstances where this may be desirable. The plaques in FIGS. 10A and 10E work with anchor 11 (FIG. 3), the plaque in FIG. 10C relates to a plaque for insertion in anchors 15 and 75 shown in FIGS. 7A, 7B, 7C, 7D, 7E and 7F, and the plaques in FIGS. 10B and 10D work with anchor 15 shown in FIG. 6A. FIG. 10A shows a plaque that would take the place of a "plug in" mounting piece. FIG. 10C shows a plaque that could be used with a horizontal slide-in anchor, and FIGS. 10B and 10D would be used with a vertical slide-in anchor. In each case the plaque would lock into the anchor and would have the same locking mechanism as the mounting piece used with that particular anchor. The presence of the plaque is displayed to the driver of the vehicle in a manner described below and, in combination with other sensors, can make the car inoperative in the case of misuse of a plaque.

Figure 11:
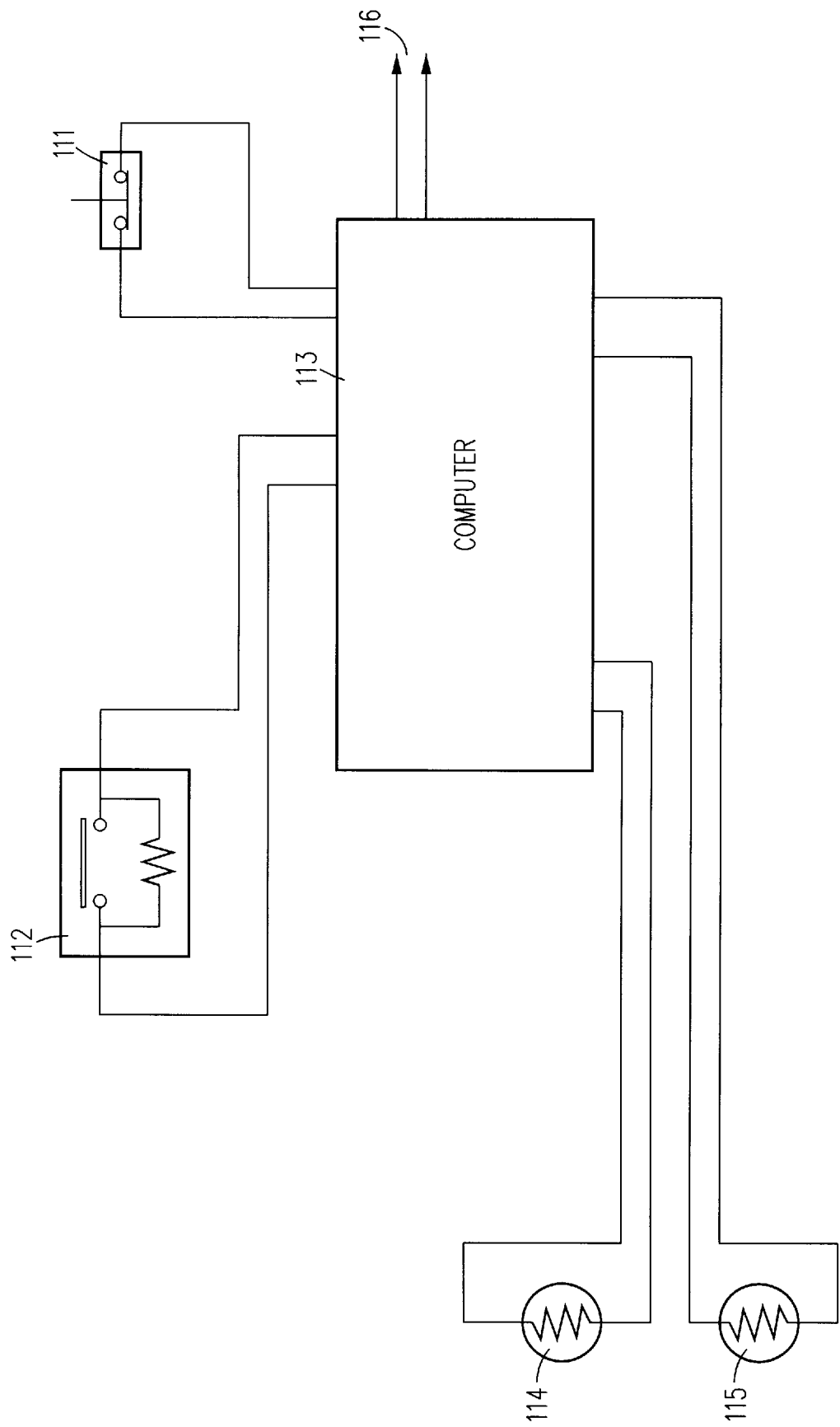
FIG. 11 shows the circuit to sense the disabling mechanism of this invention so as to disable the air bag.

FIG. 11 shows the child seat switch 111 of this invention incorporated into a vehicle which has been built to include this system. Switch 111 is shown as it would be without the child's seat of this invention installed. Switch 111 provides a signal to a computer 113. Upon insertion of the mounting piece 12 into anchor 11 (FIG. 3A), a signal is sent by switch 111 to computer 113. Upon receipt of this signal, the computer 113 sends a signal which deactivates the air bag targeted to the seat with a child's seat installed in accordance with this invention. Computer 113 activates any warning devices 116 such as lights or an audible or visual display, to indicate that the air bag is inoperative. The computer 113 can also accept input signals from other sensors in the vehicle such as seat occupancy sensors and seatbelt use sensors, to determine what other safety measures, such as deactivating the ignition system, may be appropriate.

Figure 12A:
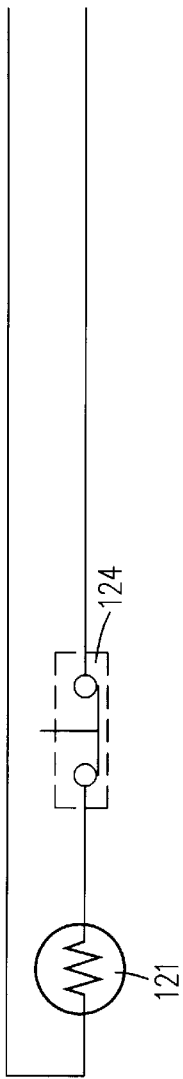
FIGS. 12A, 12B and 12C show three systems incorporating the mechanism of this invention to disable the airbag.
Figure 12B:
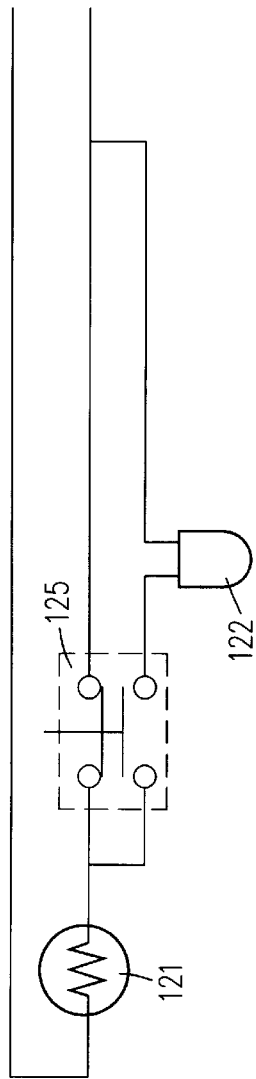
Figure 12C:
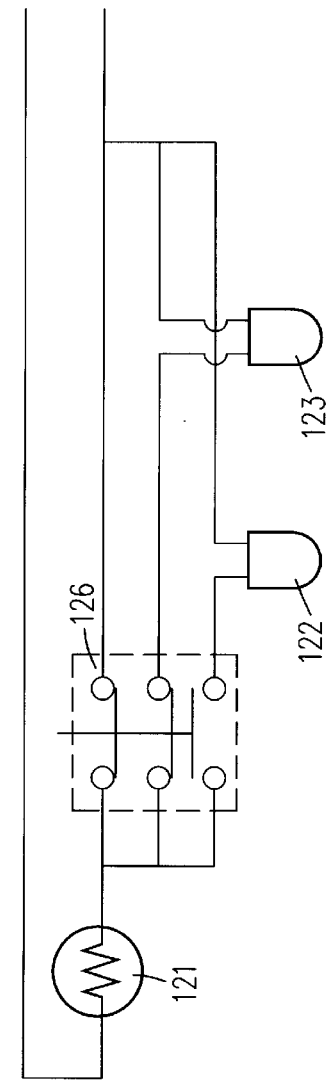

FIGS. 12A, 12B and 12C show alternative wiring schemes where the computer is not programmed in accordance with this invention to disable the air bag safety system upon use of a child's seat. FIGS. 12A, 12B and 12C show the circuits with switches 124, 125 and 126 as they would be without the child's seat 2 installed. FIG. 12A shows one embodiment where a normally closed switch 124 is in series with the air bag inflator 121 so that switch 124 is open-circuited when child's seat is installed in accordance with the invention to ensure that the circuit will not be completed in the event the airbag's gravity sensor is activated. Thus the air bag will not be inflated. In practice some minimal warning that the air bag inflator is deactivated will be required. A system to do this is shown in FIG. 12B where the normally closed switch 124 in FIG. 12A is replaced by a combined normally closed/normally open switch 125. The normally open side of switch 125 is in series with warning light 122 which will be on when the air bag is disabled in accordance with this invention. In FIG. 12C, switch 124 is replaced by a multiple pole switch (in this case shown as three poles although a different number of poles could be used depending on the number of functions to be indicated) to show that the air bag is activated. Thus when the air bag is activated, a light 123 (which might be green, for example) is turned on. However, when switch 126 is switched to a different position upon the insertion of the mounting piece 12 into anchor 11 (FIG. 3A, for example) in accordance with this invention, a red light 122 will be activated to show that the air bag is disabled and the green light will be deactivated.

Figure 13:
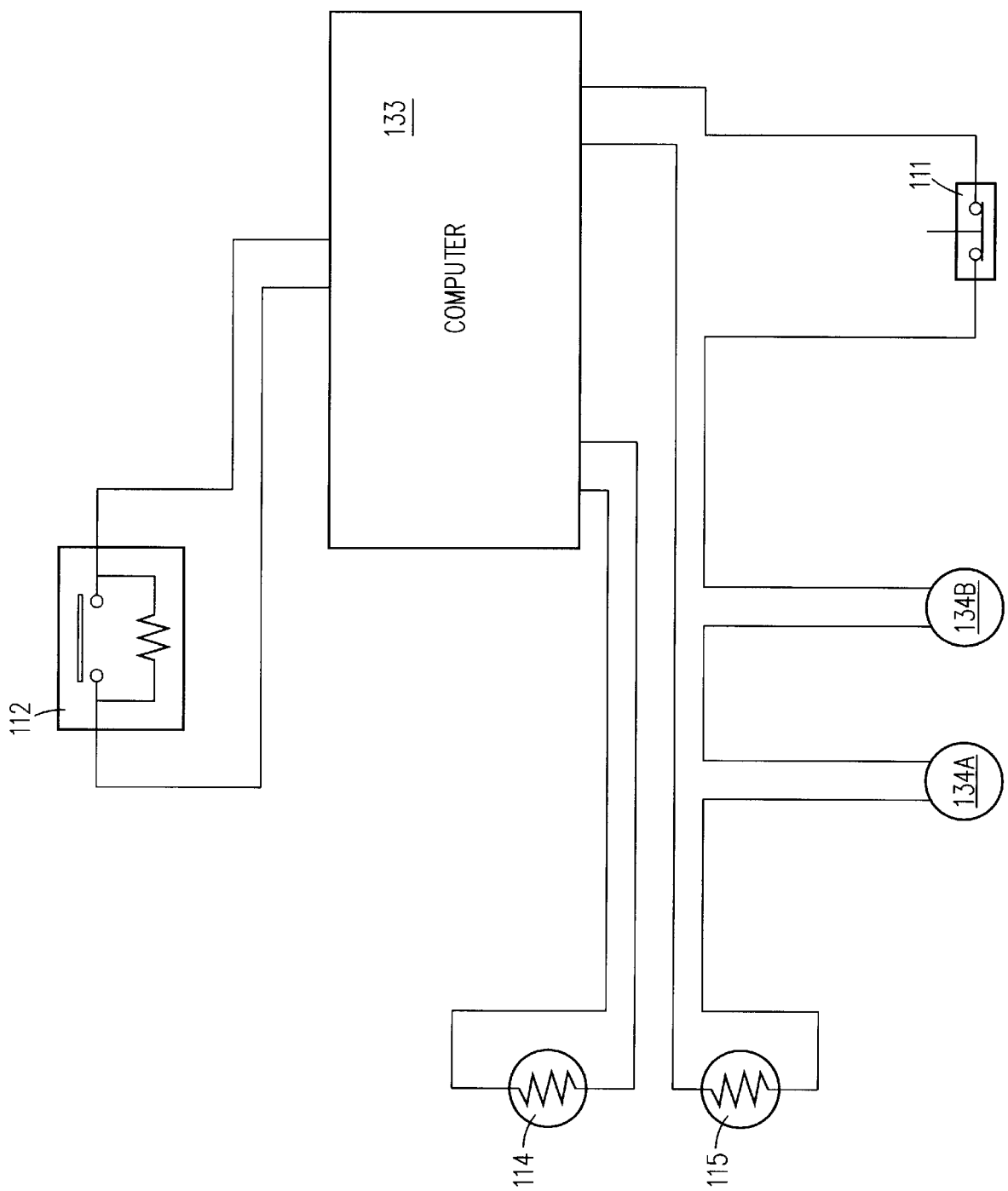
FIG. 13 shows a circuit including the child's seat activated switch of this invention.

As shown in FIG. 13, computer 133 receives input signals from gravity sensor 112 and from child seat activator switch 111. When the child seat activator switch 111 is normally closed (i.e. capable of passing a signal), computer 133 will activate the passenger seat airbag should the gravity sensor 112 indicate that the car is in an accident. When mounting piece 12 associated with a child seat 2 is inserted into anchor 11 (FIG. 3A, for example) in accordance with this invention, switch 111 is opened thereby disabling the airbag activator 115. Driver's seat activator 114 is not disabled. In addition, sensors 134A and 134B are in series with the child seat activated switch 111 to allow other conditions to disable the passenger side airbag. The passenger seat air bag activator 115 is depicted by the standard symbol used for such structures as is the driver seat air bag activator 114. Computer 133 is a standard computer available on many late model automobiles and will not be described in detail. Note that while one gravity sensor 112 is shown in FIG. 13, more than one gravity sensor 112 will typically be used in an automobile.

Throughout this specification, the child's seat switch is shown as a mechanical switch. However, other types of switches, such as electrical or optical, are also capable of being used. In the case of where the system of this invention is added onto a car not designed for it, a mechanical switch is probably the easiest and best to use. However, any switch or sensor with the appropriate circuitry is usable. In the case of a car built with this system installed, optical, magnetic, proximity or other sensors may be used that are more compatible with the car's overall system.

One of the advantages of this invention is that a plaque of the type shown in FIGS. 10A through 10E can be inserted by a single driver into the anchor of this invention thereby to disable the air bag. In case of an accident, only the driver side air bag will inflate. Because it costs a substantial amount of money (in excess of $1,000) to replace an air bag which has inflated, the ability to disable the passenger side air bag when no passenger is in the car will provide a significant cost savings to the public over time.

What is claimed is:

1. An assembly comprising:

a support structure capable of being mounted on an automobile;

a sensor mounted on said support structure, said sensor being capable of producing a signal, and a mounting piece capable of being inserted into said support structure, said mounting piece, upon insertion into said support structure, interacting with said sensor to change the signal capable of being produced from said sensor thereby to disable an air bag targeted to a specific seat in the automobile;

wherein said support structure includes an anchor for receipt of said mounting piece; and wherein said mounting piece includes a swivel bracket capable of rotatably holding a child's seat, said child's seat being capable of rotating about a swivel point of said swivel bracket in a clockwise or counterclockwise direction.

2. An assembly as in claim 1 wherein said mounting piece is slidably mounted into said anchor and wherein said anchor includes structure for locking said mounting piece in said anchor.

3. An assembly as in claim 2 wherein said structure for locking the mounting piece in said anchor includes a device spring-loaded to press against and thereby lock the mounting piece in said anchor.

4. An assembly as in claim 3 wherein said mounting piece includes an annular recess for receipt of the spring-loaded device thereby to lock said mounting piece in said anchor.

* * * * *